S. HERSEY & E. W. BLAKE.
APPARATUS FOR EFFECTING INTIMATE CONTACT OF LIQUIDS AND GASES.
APPLICATION FILED FEB. 8, 1909.
935,501.  Patented Sept. 28, 1909.
2 SHEETS—SHEET 1.
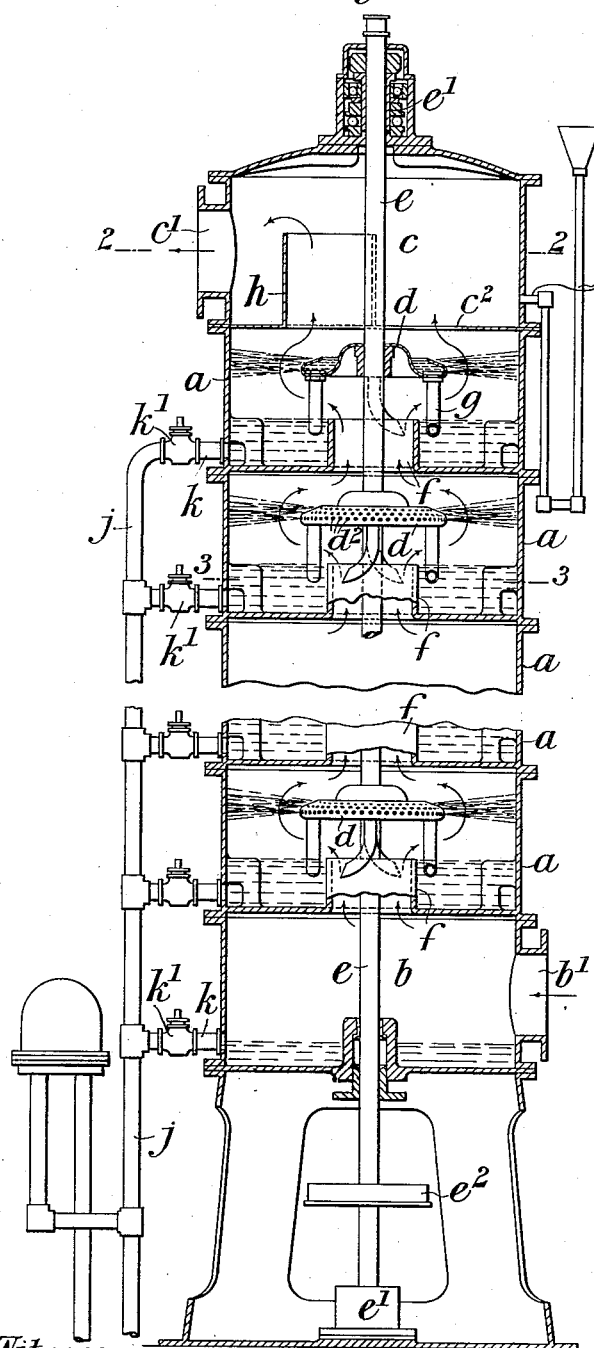
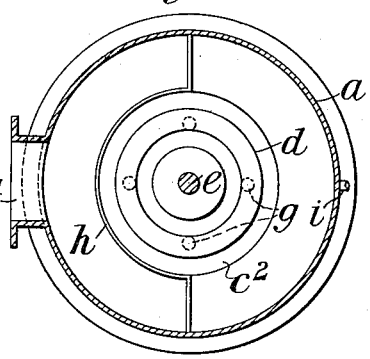
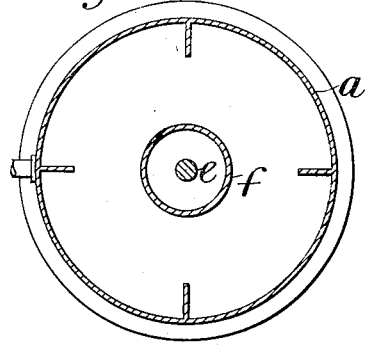
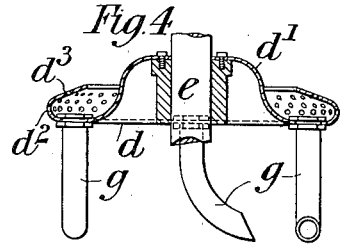
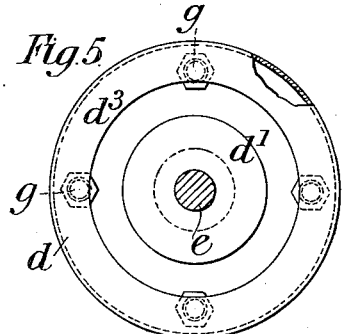
Witnesses.
J. K. Moore
R. E. Barry
Inventors
Sidney Hersey
Ernest William Blake
By Whitaker Prevost attys

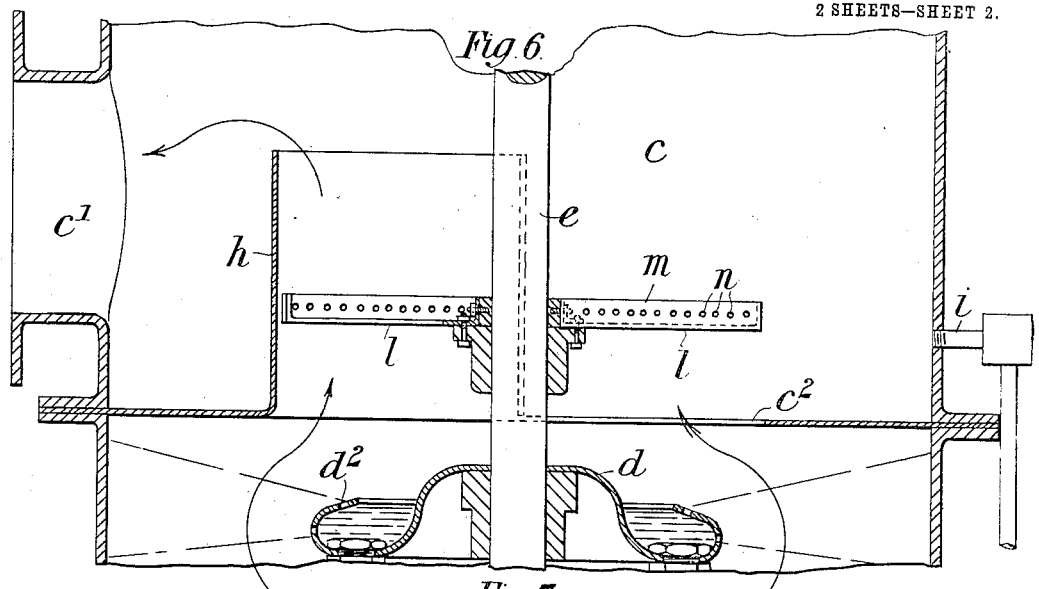
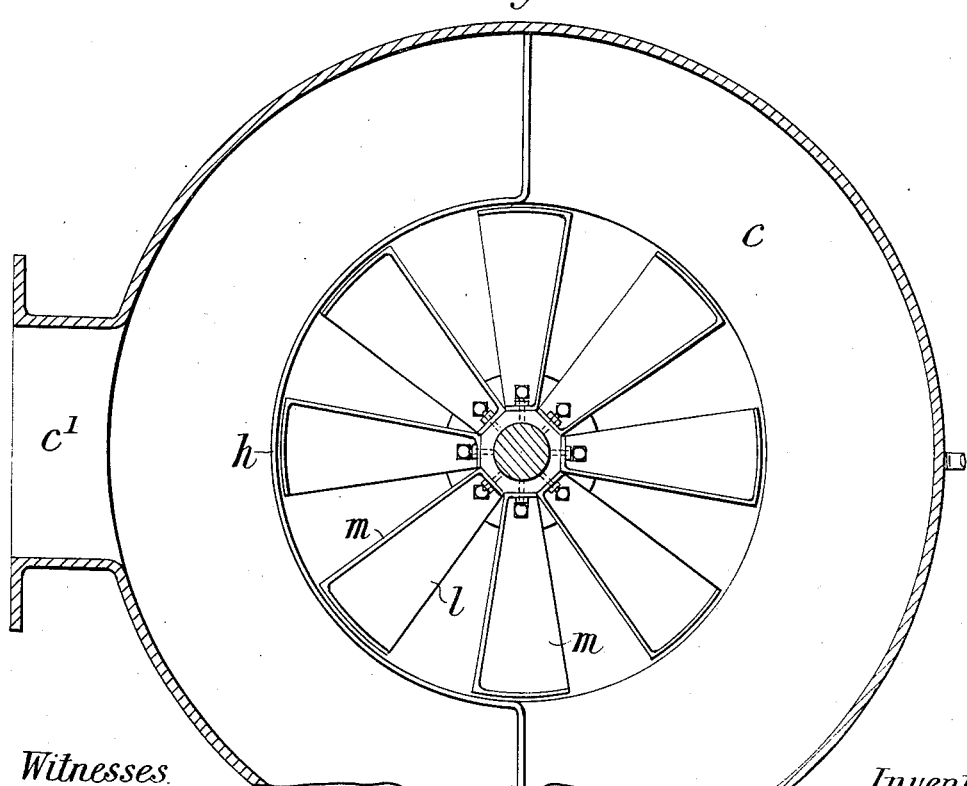

UNITED STATES PATENT OFFICE.

SIDNEY HERSEY, OF WESTMINSTER, LONDON, AND ERNEST WILLIAM BLAKE, OF SOUTH CROYDON, ENGLAND, ASSIGNORS TO KIRKHAM, HULETT & CHANDLER, LIMITED, OF LONDON, ENGLAND.

APPARATUS FOR EFFECTING INTIMATE CONTACT OF LIQUIDS AND GASES.

935,501.　　　Specification of Letters Patent.　Patented Sept. 28, 1909.

Application filed February 8, 1909. Serial No. 476,798.

*To all whom it may concern:*

Be it known that we, SIDNEY HERSEY, subject of the King of Great Britain, residing at Palace Chambers, Bridge street, Westminster, in the county of London, England, and ERNEST WILLIAM BLAKE, subject of the King of Great Britain, residing at 22 Temple road, South Croydon, in the county of Surrey, England, have invented new and useful Improvements in Apparatus for Effecting Intimate Contact of Liquids and Gases, of which the following is a specification.

Our invention relates to apparatus for effecting intimate contact of gases and liquids and is particularly designed for use in the extraction of ammonia and other impurities from coal and other gases, and to that class of such apparatus wherein the gas to be purified passes through a vessel in which the liquid is projected in the form of spray.

Our invention consists in an improved construction of such apparatus.

According to the invention our improved apparatus comprises a vertical vessel preferably of cylindrical form, and either in a single section, or advantageously in a number of sections so as to form a series of superposed chambers in a well-known way. Each of such chambers is provided with a tray mounted upon a vertical central spindle or shaft, the said tray being preferably circular in form with the upper edge inturned, and the bottom of the tray being advantageously domed upward at the center so as to cause the liquid when introduced into the tray as hereinafter described, to pass toward the periphery thereof, the underside of the said domed portion assisting in the tendency to produce a vacuum within the vessel which exhausts gas from the chamber immediately below that in which the tray is revolving, and thus prevents back pressure. The outer periphery of the tray is provided with perforations or slots, and upon the underside of the said tray we arrange one or more tubular or other form of scoops in connection with the interior thereof.

The gas to be purified enters the gas inlet chamber at the bottom of the apparatus, and leaves this chamber through the upper part by means of one or more outlets, the said outlets acting also as over-flow pipes for the washing liquid from the next higher chamber. In practice we prefer to employ a single gas outlet leading from chamber to chamber and to arrange this outlet at the center, that is to say, surrounding the spindle or shaft. The gas in this case is acted upon by the exhausting action of the rotating perforated tray in each chamber by which it is also centrifugally directed toward the walls of the chamber into the spraying area, through the spray and thence passes upward through the central discharge opening. The washing liquid is preferably introduced into the gas outlet chamber at the upper end of the apparatus.

In practice we prefer to arrange a number of vessels of the type above described one above the other, the overflow from each vessel passing into the vessel immediately below it and the gas being introduced at the bottom of the lowermost vessel, thus passing in succession through the whole series of vessels from the bottom to the top and emerging from the uppermost vessel in a highly purified condition, while the liquid which leaves the lowermost vessel is most highly charged with impurities.

To enable the invention to be fully understood, we will describe it by reference to the accompanying drawing, in which:—

Figure 1 is a sectional elevation of gas washing apparatus constructed according to the invention. Fig. 2 is a section on the line 2—2 Fig. 1. Fig. 3 is a section on the line 3—3, Fig. 1. Fig. 4 is a vertical section of one of the spraying trays drawn to a larger scale, and Fig. 5 is a plan view thereof with a portion of the rim removed to show the interior of the tray. Fig. 6 is a vertical section, and Fig. 7 is a horizontal section illustrating a modification drawn to a larger scale than Figs. 1 to 5.

$a, a$ represent a series of superposed chambers each of which is designed to partially wash gas passing through it as hereinafter described, the lowermost of these chambers $a$ being mounted upon the chamber $b$ which is provided with the gas inlet $b^1$ and the uppermost chamber $a$ having mounted upon it the gas outlet chamber $c$ provided with the gas outlet $c^1$.

$d, d$ are the trays one of which is mounted in each of the chambers $a$, and all of which are keyed upon the central shaft or spindle $e$. This spindle is rotatably mounted in bearings $e^1$, $e^1$ at the top and bottom of the complete apparatus, and is adapted to be rotated by the pulley $e^2$ from any suitable source of power.

Each of the chambers $a$ is provided at its bottom with a central upwardly extending tube or lip $f$, this tube or lip forming a central connection between the said chamber and that immediately below it. Its height above the bottom of the chamber determines the depth of liquid which is normally retained within the chamber, and it also serves as a passage for the gas to be cleansed from chamber to chamber. As will be obvious in the construction illustrated, the central gas supply and liquid overflow passages serve also to permit of the passage of the driving shaft $e$ through the apparatus from top to bottom.

As above described, each of the trays $d$ is keyed upon the shaft $e$ and is domed upward at the center as shown at $d^1$ and provided at the periphery with perforations $d^2$, $d^2$, the outer extremity of the periphery being inturned as shown at $d^3$ so as to prevent the liquid being discharged over the edge of the tray.

$g$, $g$ are the scoops which are preferably of the shape indicated clearly in Fig. 4, and which depend from the underside of the tray between the domed portion $d^1$ and the perforations $d^2$ thereof.

The chamber $c$ which is fitted with the outlet $c^1$ for the cleansed gas is provided with the upwardly projecting semi-circular baffle $h$ around an opening $c^2$ in the bottom of the said chamber, which opening in addition to serving as an outlet for the gas from the upper chamber $a$ also serves for the introduction of the cleansing liquid, this being effected through the inlet pipe $i$.

$j$ is the discharge pipe for the liquid, this pipe $j$ being connected to each of the chambers $a$, $a$ and the chamber $b$ by branch pipes $k$ fitted with cocks $k^1$.

The apparatus operates as follows, for washing gas, vapors, and the like, or for bringing gas into intimate contact with the liquid. Assuming that each of the chambers $a$ can be supplied with a quantity of liquid as indicated in Fig. 1, and that the shaft $e$ can be rotated by means of the pulley $e^2$, the trays $d$, $d$ are caused to revolve whereby the scoops $g$, $g$ depending from their lower sides pick up the liquid into which they dip and cause it to pass into the said trays $d$, the said scoops also acting as vanes. The centrifugal force which is generated by the rotation of the trays discharges the said liquid through the perforations or slots $d^2$, $d^2$ in the peripheries of the trays so that it finds its way into the chambers in the form of a spray which comes into contact with the upflowing gas, then strikes the walls of the said chambers, from which it rebounds and thereby comes into repeated contact with the gases, vapors, or the like which are passed into the apparatus through the inlet $b^1$ and rise up successively through the chambers $a$, their upward flow being assisted by the exhausting action which is induced by the trays $d$, $d$.

It will therefore be obvious that the gas which enters the lowermost chamber $a$ passes successively upward through the complete series of chambers, being subjected to repeated cleansing in such chambers until it finally issues into the chamber $c$ and thence escapes through the outlet $c^1$ in a properly cleansed condition. The washing liquid is run off through the discharge pipe $k$ from the chamber $b$; normally the cocks of the chambers $a$, $a$ are shut and that of the chamber $b$ open, the former cocks being for flushing purposes only.

In some cases we may provide a fan at the top of the apapratus (as illustrated in Figs. 6 and 7), this fan serving to increase the upward draft for the upward flow of the gases or the like. The blades ($l$, $l$) of the fan may advantageously be formed with upturned lips ($m$, $m$) having perforations ($n$, $n$). The fan may be used as a ventilating or drying fan, or the liquid may be introduced on it and projected through the perforations in the fan blades by the centrifugal action generated by the rotation of the fan, the discharge liquid passing into the chamber immediately below the fan.

Having now particularly described and ascertained the nature of our said invention, and in what manner the same is to be performed, we declare that what we claim is:—

1. In apparatus of the kind described, the combination with a casing containing one or more chambers, of a revoluble tray in each of said chambers, said trays being provided with perforated receptacles at their outer ends, means for supplying liquid to said receptacles, and means for rotating said trays.

2. In apparatus of the kind described, the combination with a casing containing two or more chambers, provided with openings connecting said chambers, of walls around said openings, a revoluble tray in each of said chambers, said trays being provided with perforated receptacles at their outer ends, means for supplying liquid to said receptacles and means for rotating said trays.

3. In apparatus of the kind described, the combination with a casing containing one or more chambers, of a revoluble tray in each of said chambers, the outer edges of said trays being inturned to form receptacles and the bottom domed upwardly, the inturned portions being provided with perforations, of scoops depending from the tray for supplying liquid to the trays, and means for revolving the trays.

4. In apparatus of the kind described, the combination with a casing containing two or more chambers, provided with openings connecting said chambers, of walls around said openings, a revoluble shaft passing through said openings and mounted in suitable bearings, trays in each of said chambers mounted on said shaft, said trays being provided with perforated receptacles at their outer ends, scoops secured to the trays for supplying liquid to the receptacles, means for rotating the shaft and trays, means for supplying liquid for all the chambers and means for admitting and demitting gas to and from the apparatus.

SIDNEY HERSEY.
ERNEST WILLIAM BLAKE.

Witnesses:
  JOHN E. BOUSFIELD,
  C. G. REDFERN.